June 27, 1967 R. P. SCHWARTZ ETAL 3,328,085

SEAT SUSPENSION

Filed Feb. 9, 1966

INVENTORS
Roger P. Schwartz
John A. Welch
BY James A. Lucas
Frank J. Earnheart
ATTORNEYS United States Patent Office 3,328,085
Patented June 27, 1967

3,328,085
SEAT SUSPENSION
Roger P. Schwartz, Akron, and John A. Welch, Cuyahoga Falls, Ohio, assignors to The General Tire & Rubber Company, a corporation of Ohio
Filed Feb. 9, 1966, Ser. No. 526,144
13 Claims. (Cl. 297—452)

This invention relates to a novel seat suspension and to the seat produced therefrom. More particularly, this invention relates to an improved suspension system for the incorporation into seats and the like and includes a flexible, substantially nonextensible support member attached to an appropriate frame or the like by a plurality of elastomeric shear mountings. Yet more particularly, the construction of the present invention comprises a flexible reticulated platform attached to the frame of the seat by a plurality of elastomeric shear blocks around the edges of the platform and the seat produced by covering the platform with a layer of foam or the like which is integrally bonded to said platform.

Seats have heretofore been constructed by utilizing a plurality of interconnected metal springs wrapped in a material such as burlap and covered with a suitable cushioning material for purposes of comfort. Various foams such as rubber latex and polyurethane have been found to be particularly suitable for the purpose of covering these springs, and as foaming technology has progressed, attempts have been made to foam around the springs with penetration of the burlap to form a unitary structure. Seats constructed in this manner were found to have a variety of drawbacks; for example, the cost of manual labor and materials was found to be excessive. Furthermore, there was always the possibility that a loose end of a sharp edge of one of the springs would tear through the burlap and abrade the foam material, sometimes creating discomfort for the person sitting on the seat.

More recently, attempts have been made to eliminate the use of metal springs in seats, and some of these attempts have involved the utilization of elastomeric diaphragms or webbing. This approach has yielded a substantial reduction in labor costs, but the resultant seat suffers from the drawback that it is not able to successfully reproduce the inherent spring rate and comfort of the metal-spring seat. Furthermore, difficulty has been encountered in attempting to bond the stretchable elastomeric diaphragm or webbing to the overlying layer of foam.

It is one object of this invention to overcome the objections of the prior art seating structures while producing a low-cost seat having a comfortable springing action;

Another object of this invention is to produce a seat which utilizes a flexible but substantially inextensible load-supporting platform connected to the structural framework of the seat by a plurality of elastomeric shear tabs spaced around the peripheral portion of the platform.

These and other objects are accomplished in the manner to be hereinafter described, with particular reference to the following drawings in which.

This invention relates to a resilient seating suspension comprising a support platform of flexible but substantially inextensible material, a plurality of elastomeric shear tabs spaced around the peripheral portion of said platform, and means for securing said tabs to a chair structure. The substantially inextensible platform is preferably composed of a suitable fabric or other type of material; for instance, a reticulated sheet of nylon. Disposed over and around said platform and shear blocks is a layer of suitable foam material, preferably polyurethane, which is securely bonded to the platform. For decorative purposes, a suitable covering such as a supported or unsupported vinyl surrounds and covers the foam, platform, and shear blocks.

Figure 1:
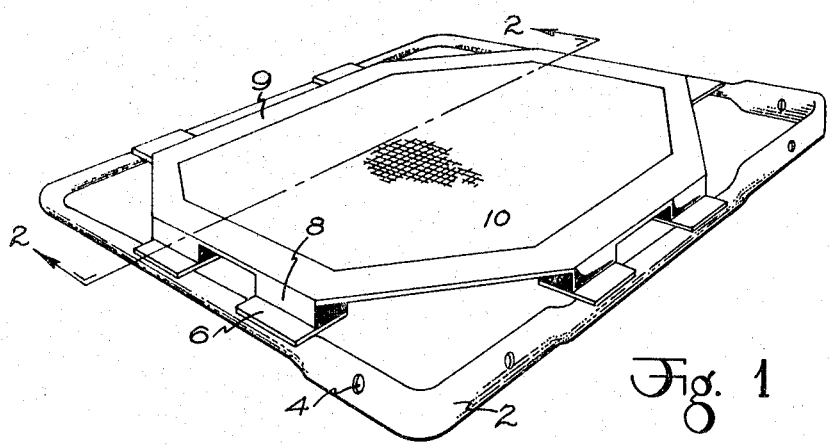
FIGURE 1 is a perspective view of one embodiment of the seat suspension system of this invention.

With reference to FIGURE 1, a tubular frame 2 of generally circular cross section represents the structural portion of a seat. The frame is provided with a plurality of holes 4 which are used to attach the frame to the back of the seat and/or to the body of an automobile or the like. A plurality of clips 6 are spaced around and attached to the frame 2 by suitable means such as spot welding.

Bonded to each clip is a rectangular shear block composed of an elastomeric material such as natural rubber. The periphery of a suitable platform 10 is bonded to the opposing surface of the shear block which is parallel to that bonded to the clip. This platform is composed of a flexible but substantially inextensible material such as nylon which is woven into a suitable fabric. Typically, the shear blocks 8 are molded to the platform and are then cured. During the molding a thin border 9 of the elastomer is molded around the periphery of the platform to reduce the tendency of the edges of the fabric to unravel.

Figure 2:
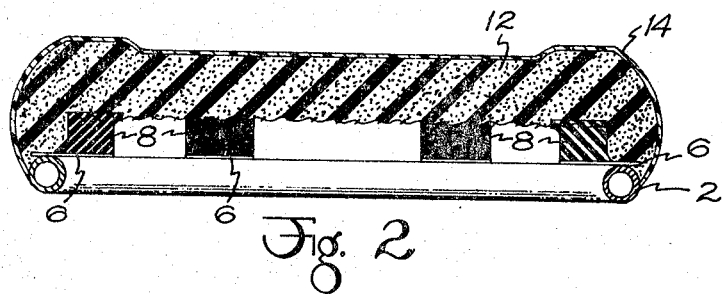
FIGURE 2 is an elevational view of a completed seat assembly utilizing the suspension system of FIGURE 1 as taken along lines 2—2 of the same.

FIGURE 2 shows a suspension system of the type shown in FIGURE 1 integrally embodied into a finished seat. A plurality of elastomeric shear blocks 8 are bonded to the peripheral portion of a suitable, substantially inextensible platform 10. The opposing surface of each shear block is bonded to a metal clip 6 which is fastened to the tubular frame 2. Disposed over and around the shear block 8 and platform 10 is a suitable cushioning material 12 such as polyurethane foam which is preferably foamed in place. When the platform is constructed from a fabric, the foam typically penetrates the interstices thereof and becomes securely anchored thereto. The inextensible nature of the platform substantially precludes breaking the bond between the seat and the platform when the various portions of the seat are deflected, such as when a person is sitting upon the seat. The cushion material is enclosed within a suitable decorative covering material 14 such as a supported or unsupported layer of polyvinyl chloride. Plastic covering materials such as PVC may be produced in a variety of colors, patterns, and textures and provide the scuff and tear resistance which is necessary to produce a satisfactory and long-wearing covering. The covering material extends around to the frame to which it is secured or bonded by a suitable adhesive or the like.

Figure 3:
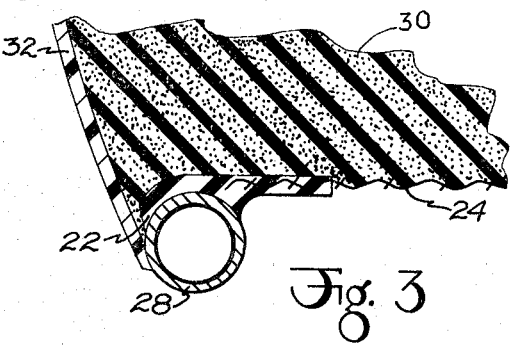
FIGURE 3 is a partial elevational cross section, enlarged for clarity, showing one manner in which the shear block is attached to the structural framework of the seat.

FIGURE 3 shows a close-up view of a modified shear block which can be used in the suspension system of the present invention. It can be readily discerned that this shear block is substantially thinner than those shown in FIGURES 1 and 2, this reduction in thickness resulting in the production of a substantially stiffer suspension. The shear block 22 is attached to the fabric 24 and is molded directly to the tubular frame 28. A suitable cushioning material 30 is disposed on top of the above-mentioned components, and this in turn is enclosed in an appropriate upholstery material 32.

Figure 4:
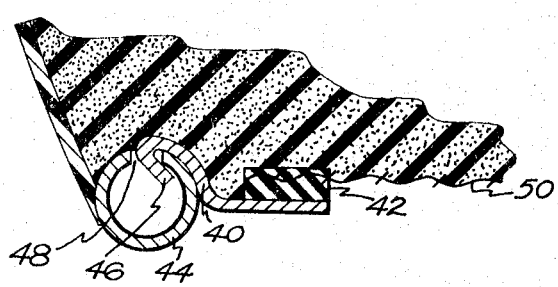
FIGURE 4 is a view similar to FIGURE 3 showing another means of attachment.

FIGURE 4 differs from FIGURE 3 in that a clip 40 is used to attach the elastomeric shear block 42 to the frame 44 and is provided with a hook 46. This hook is adapted to be engaged in an appropriate slot 48 within the frame 44 to thereby facilitate assembly of the composite structure.

Figure 5:
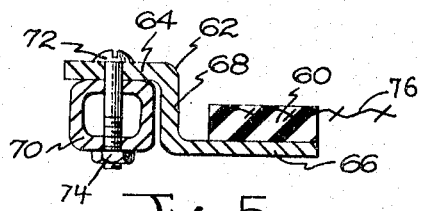
FIGURE 5 shows yet another means for attachment to a frame.

In FIGURE 5 an elastomeric shear block 60 is bonded to a metal clip 62 having two parallel legs 64, 66 connected by an intermediate transverse connecting portion 68. The clip is secured to a rectangular metal frame 70 by a nut 72 and bolt 74 passing through the clip and frame. The edge of inextensible platform 76 is bonded to the upper surface of the shear block.

As an example of the teachings of the present invention, the following description relates to the construction of an automotive seat commonly referred to as a "bucket seat." For the construction of this seat a tubular metal frame, approximately 20 inches square, was used for the structural support member. A plurality of metal clips, approximately 1/8 inch thick and 1 inch wide, were bent into substantially the same shape as those shown in FIGURE 5, and two of these clips were welded to each of the four sides of the frame. The two clips at the front of the seat were spaced 7 inches apart and the two clips at the back of the frame were positioned about 10 inches apart, in a symmetrical location. The two clips on either side of the seat were spaced about 7 inches apart and were located slightly to the rear of the center of the seat to make allowance for the fact that the weight of a person, when sitting, is generally distributed toward the rear of a seat.

A shear block composed of natural rubber having a durometer hardness of approximately 55 was bonded to the top of the inwardly projecting leg of each clip. Each of these blocks was 1 inch square and 3/4 inch thick. The opposite surface of each block was bonded to the periphery of a substantially inextensible platform. This platform was composed of a coarse nylon fabric which had been resin-impregnated to increase its rigidity and strength. The fabric was woven to produce about 13 pore openings per inch and a pore size of about 3/64 inch. This suspension system as described gave a maximum vertical deflection of 1½ inch when subjected to a load of a 165 pound man.

It is obvious that the load deflection characteristics of the above-described seat could be varied in a number of ways. If it is desired to provide a softer seat by an adjustment in the seating suspension, this can be accomplished in a number of ways; for example, the thickness of all of the shear blocks can be increased or, alternatively, the number of blocks or the cross section of each can be reduced. A reduction in the hardness of the compound will accomplish the same results. Conversely, a stiffer suspension can be provided in the opposite manner, i.e., by decreasing the thickness of the shear blocks or increasing the hardness of the elastomer, etc. Furthermore, the type of elastomer will have some effect upon the properties of the shear block.

The shear blocks are preferably used in such a manner that the platform is bonded to the top surface thereof while the bottom surface is secured to the metal clip or to the frame of the chair. Thus, a vertically imposed load, such as that imposed by a person sitting on the seat, creates a force on the elastomeric blocks which places the block in shear and compression. On the other hand, if the platform is bonded to the bottom surface of the blocks and the metal clip attached to the top surface, the blocks are subjected to a combination shear-tension force. The suspension system will perform adequately under these latter circumstances; however, the properties of rubber and most other elastomers can be more effectively utilized in compression than in tension.

There are a number of different types of elastomers that could be used to produce shear blocks of satisfactory quality for the suspension system of the present invention; for example, terpolymers of ethylene and propylene, formulations of natural rubber, neoprene, etc., or any other rubber that possesses a good ability to recover from shear or compression deformation could be used. Although a durometer hardness range of 50 to 60 has been found to work satisfactorily, departures could be made therefrom without adversely affecting the operation of the invention.

The precise location, number, and spacing of the various shear blocks is subject to wide variation, again depending on the various properties desired in the final product.

Although the invention has been described in connection with cushion materials of polyurethane foam, there are other types of cushioning materials which could be used; for example, latex foam, cotton batting, etc.

The covering material may be made from any number of materials which are commonly used in upholstering, including plastics, fabrics, leather, and the like.

Although described in connection with its use in seats, the suspension system of this invention can be used for the back support as well. It can be used in domestic furniture including chairs and couches, and in vehicles such as automobiles, buses, and trains.

There are many other variations that can be made in constructing a seat suspension as described in this invention without departing from the novelty thereof which is defined and described in the following claims, in which we claim:

1. In a seating structure, a resilient suspension comprising:
   (a) a flexible, substantially inextensible platform adapted to yieldingly support a person sitting thereon,
   (b) a rigid supporting frame spaced from said platform, and
   (c) a plurality of elastomeric blocks spaced apart from one another connected to the periphery of the platform and to the frame and each adapted to deform primarily in shear when a weight is applied to said platform.

2. A composite seat including a seat frame and a layer of cushioning material adapted to provide comfort for the person seated thereon, the improvement comprising a flexible and substantially inextensible platform underlying at least a substantial portion of said layer, a plurality of elastomeric shear blocks each having a pair of generally parallel surfaces, one surface of which is bonded to said platform at the periphery thereof and the other surface connected to said seat frame, said parallel surfaces being generally coplanar with the platform whereupon a vertical load applied to said platform will cause said platform to deflect vertically and will be resisted by the elastomeric blocks deforming principally in shear.

3. The composite seat according to claim 2 wherein the platform is composed of a unitary piece of nylon fabric.

4. The seat according to claim 3 wherein the elastomeric blocks are composed of a rubber having a hardness of at least 50 durometer.

5. The seat according to claim 4 wherein the platform is positioned above the seat frame.

6. A structure according to claim 1 wherein said platform is composed of a reticulated fabric material.

7. The structure according to claim 6 wherein said fabric material is nylon.

8. The seating structure according to claim 1 wherein each of said elastomeric blocks has at least two generally parallel surfaces, one of which is mold bonded to the periphery of the fabric material.

9. A structure according to claim 8 wherein said means for connecting each elastomeric block to the structure comprises a metal clip bonded to the other of said generally parallel surfaces.

10. The structure according to claim 8 wherein said frame is metal and said clip is welded to said frame.

11. A structure according to claim 9 wherein said clip is provided with a hook adapted to engage a slot in said frame.

12. A structure according to claim 9 wherein said clip is bolted to said frame.

13. A structure according to claim 8 wherein the other generally parallel surface of each block is bonded directly to the frame.

References Cited

UNITED STATES PATENTS

| | | | |
|---|---|---|---|
| 208,820 | 10/1878 | Hubbell | 248—350 |
| 2,371,954 | 3/1945 | Cunningham. | |
| 3,007,692 | 11/1961 | Kniffin. | |
| 3,140,086 | 7/1964 | Lawson. | |
| 3,146,028 | 8/1964 | Grosfillex | 297—454 X |
| 3,179,469 | 4/1965 | Heuston | 297—452 |
| 3,208,085 | 9/1965 | Grimshaw | 5—345 |
| 3,237,214 | 3/1966 | Grimshaw | 297—456 X |
| 3,252,735 | 5/1966 | Smith | 297—452 |
| 3,275,131 | 9/1966 | Erickson | 248—350 X |

CASMIR A. NUNBERG, *Primary Examiner.*